May 12, 1964
A. NADAI
3,132,807
SPRAY DEVICE
Filed Oct. 12, 1960
2 Sheets-Sheet 1
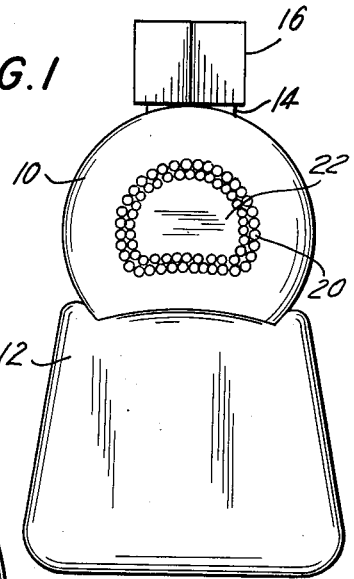
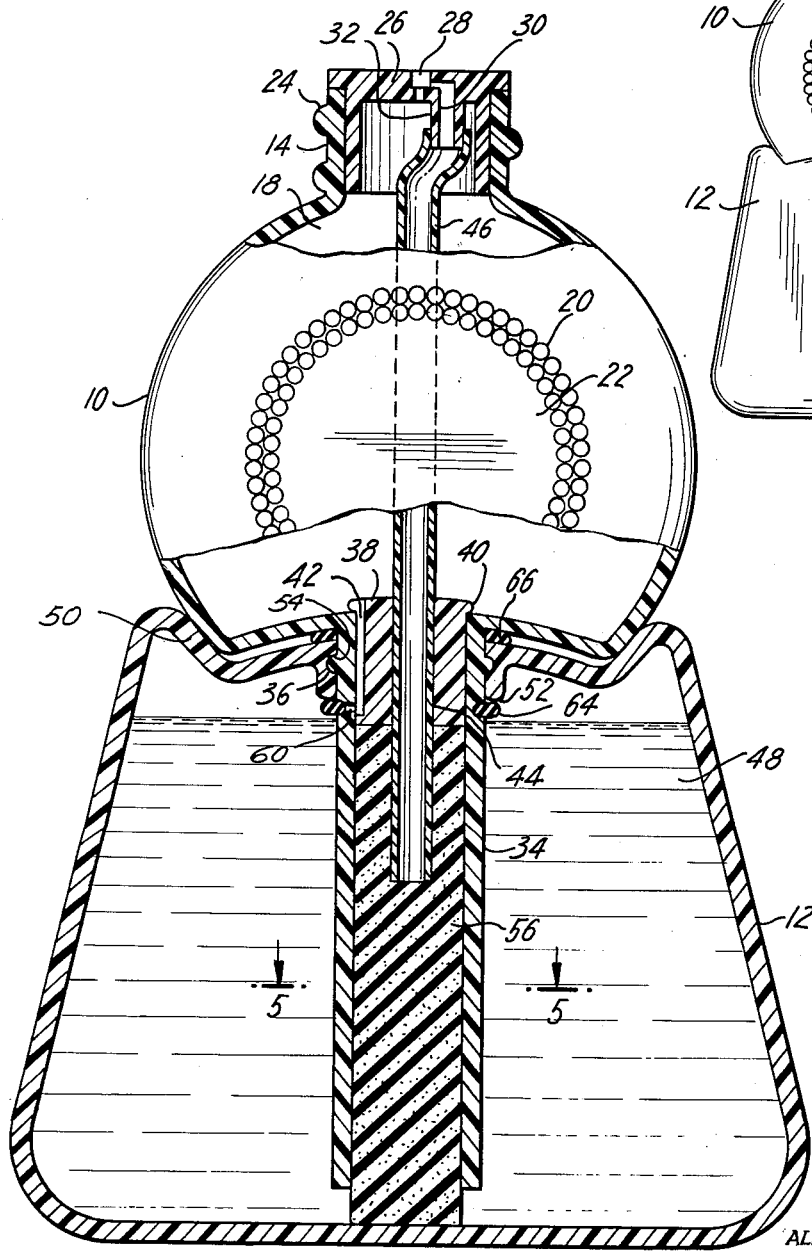
INVENTOR.
ALEXANDER NADAI
BY
Alan K. Roberts
ATTORNEY May 12, 1964     A. NADAI     3,132,807
SPRAY DEVICE
Filed Oct. 12, 1960     2 Sheets-Sheet 1
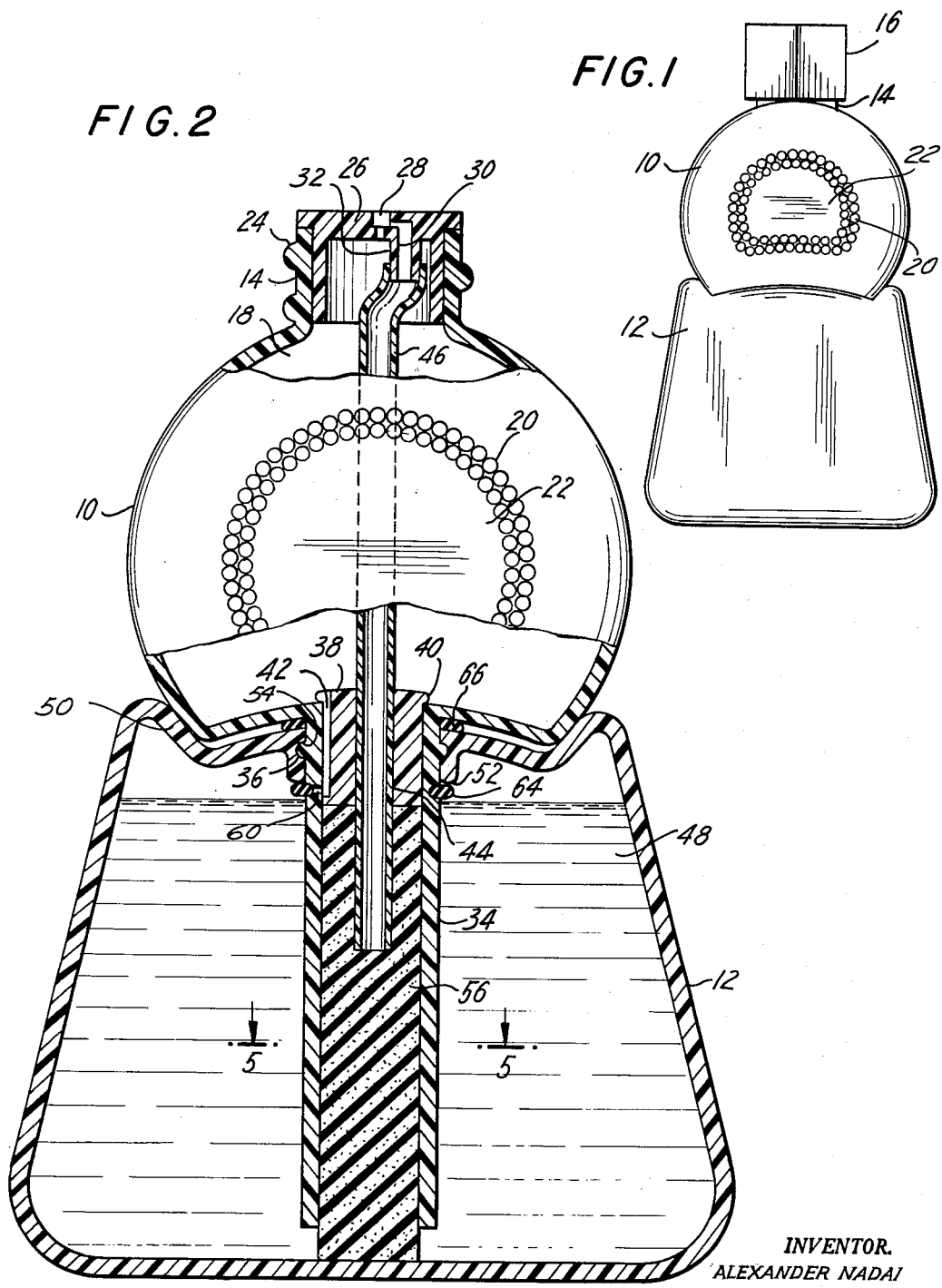
INVENTOR.
ALEXANDER NADAI
BY
ATTORNEY

United States Patent Office 3,132,807
Patented May 12, 1964

3,132,807
SPRAY DEVICE
Alexander Nadai, 3215 Arlington Ave., Bronx,
New York 63, N.Y.
Filed Oct. 12, 1960, Ser. No. 62,141
20 Claims. (Cl. 239—327)

This invention relates to spray-type dispensing devices.

It is an object of the invention to provide an improved squeeze-type bottle adapted for dispensing a fluid in the form of a spray.

Still another object of the invention is to provide improved techniques for manufacturing squeeze-type bottles which techniques are compatible with blow molding techniques as are commonly employed in the manufacture of spray devices.

Still a further object of the invention is to provide an improved structure which is adapted to dispense fluids in the form of a spray and which is, at the same time, capable of functioning in tilted and inverted positions, this being a distinct advantage over known structures which tend to leak when tilted or inverted and which thus cannot properly dispense fluids in the form of spray when tilted or inverted.

In achieving the above and other of its objectives, the invention contemplates, in association with known aspiration techniques and the like, the provision and use of a storage means which accepts a portion of the fluid contents of a dispensing device and holds this portion in readiness for distribution quite independently of the position of the dispensing device.

According to a feature of the invention, this storage means may, in addition, function to block an undesired escape of fluid from the dispensing device so that said device can operate in inverted position.

According to a further feature of the invention, the dispensing device is provided with separate pneumatic and fluid chambers which may be provided in separate members to facilitate blow molding.

In accordance with still another feature of the invention, the members providing for the pneumatic and fluid chambers are respectively fabricated of relatively deformable and flexible and relatively rigid materials in order to facilitate aspiration while preventing the direct application of forces to the fluid which is to be dispensed.

Still another feature of the invention relates to the provision of means for maintaining atmospheric pressure in a fluid chamber to permit aspiration of the fluid, while avoiding direct connection between the fluid chamber and the ambient atmosphere.

Yet another feature of the invention is the provision of special means to enable the attaining of optimum pneumatic and aspiration conditions for purposes of forming the most desirable type of spray.

Still a further feature of the invention relates to the provision of special connecting means to connect the members defining the pneumatic and fluid chambers.

Advantageously, the structure of the invention can be furnished at low cost inasmuch as economical manufacturing techniques can be employed.

It is to be noted further that the techniques of the invention permit the easy loading of dispensing devices wherein the fluids to be dispensed can be stored without evaporation.

Structures of the invention are readily stored and shipped and advantageously provide an excellent spray and are adapted to dispense substantially all of their fluid contents.

Other objects, features and advantages of the invention will be apparent from the following detailed description of some preferred embodiments as illustrated in the accompanying drawing in which:

FIG. 1 is a side view of a spray bottle provided in accordance with a preferred embodiment of the invention;

FIG. 2 illustrates the bottle of FIG. 1, partially broken away and partially in section, to reveal the inner structure thereof;

FIG. 3 is a longitudinal, sectional view of one of the elements of the bottle of FIG. 1;

FIG. 4 is a longitudinal, sectional view of another of the elements of the bottle of FIG. 1;

FIG. 5 is a sectional view taken along line 5—5 of FIG. 2; and

FIG. 6 illustrates a modification of the structure of FIG. 2.

The dispensing device, or spray bottle, illustrated in FIG. 1 comprises an upper casing 10 and a lower casing 12, the upper casing 10 being provided with a neck 14 accommodating a cap 16.

FIG. 2 reveals the internal structure of the spray bottle of FIG. 1, the cap 16 having been removed.

In FIG. 2 (see also FIG. 4) it is seen that casing 10 defines an inner or pneumatic chamber 18. It is also seen that casing 10 is provided with a plurality of ribs 20 which define a central relatively stiff area 22.

The casing 10, in defining a pneumatic chamber, is a part of an aspiration device, the function of which will be explained in greater detail hereinafter. It should be noted, however, that the casing 10 is preferably fabricated from a relatively deformable and flexible material such as polyethylene for purposes of permitting the discharge of a pneumatic medium such as air. The utility of ribs 20 in association with this function will be discussed hereunder.

As noted above, casing 10 is provided with a neck 14. This neck is provided with a thread 24 by means of which the cap 16 (FIG. 1) is threadably accommodated.

Within the neck 14 is positioned a plug 26. Plug 26 may be frictionally accommodated as illustrated in FIG. 2 or may alternatively be threadably or otherwise engaged.

Plug 26 is provided with a discharge opening 28 for the discharge of air from the chamber 18 and is further provided with a fluid channel 30 for discharging fluids stored in the casing 12, as will be explained. Discharge opening 28 and fluid channel 30 are operatively connected in aspirating relationship, channel 30 being extended by means of a tube 32.

Extending downwardly from casing 10 is a tubular extension 34 by means of which a mechanical connection is provided between casings 10 and 12. On the tubular extension 34 is provided an annular bead 36 which forms the part of a bead and socket arrangement, the remainder of which will be described below.

Within tubular extension 34 is accommodated a plug 38. This plug includes a rim 40 seating on the inner bottom wall of casing 10. Plug 38 also comprises an axial groove or slot 42 extending downwardly along the length of said plug and is provided with a centrally located bore 44, the purpose of which will next be explained.

An aspiration tube 46 is provided which frictionally engages tube 32 and extends downwardly through the bore 44. The aspiration tube 46 constitutes a connecting means operatively connecting chamber 18 with casing 12 for purposes of aspiration.

Casing 12 (see also FIG. 3) defines a fluid storage chamber 48 wherein are accommodated the fluid contents which are to be dispensed. This fluid may be, for example, medicine, deodorant, and so forth.

In order to prevent the direct application of manual forces to the fluid in chamber 48, casing 12 is fabricated of a relatively stiff material such as polypropylene or the like. The relative deformability and stiffness of casings 10 and 12, respectively, adapt the dispensing device of the invention to its proper use.

Casing 12 is provided with shoulders 50 which form a seating for the bottom portion of the casing 10. Casing 12 is, moreover, provided with an inwardly and downwardly extending collar 52 provided with an annular groove 54 which accommodates the bead 36 on tubular extension 34.

From what has been stated above, it will be appreciated that physical connection and proper positioning between casings 10 and 12 are facilitated by the provision of shoulders 50 and by means of tubular extension 34 and collar 52, as well as by the bead and socket arrangement including bead 36 and groove 54.

A principal problem encountered in known dispensing devices of the spray bottle type is that the fluid contents thereof leak out when the devices are inverted. Moreover, when known devices are tilted, the fluid contents thereof are unfavorably removed from any zone of operative association with the aspiration mechanism provided therefor and thus cannot be dispensed.

It is, as noted above, an object of the invention to provide means for avoiding this difficulty and to this end the invention contemplates the provision of a temporary storage means which receives fluid from the associated fluid chamber and holds the same operatively disposed with respect to the aspiration device provided for dispensing the same. Moreover, it is a further object of the invention to employ said storage means to prevent the ready egress of fluid from the casing 12 even though the spray bottle of the invention is inverted.

For this purpose, there is provided a storage device which, in this embodiment of the invention, consists of the absorption device 56 (see also FIG. 5). This absorption device may be of a textile material such as felt, cotton, and so forth, but is preferably a foamed material such as rubber or plastic. The function of absorption device 56 is to receive and temporarily accommodate fluid from the chamber 48. This is readily accomplished because of the absorption characteristic of the device. Further, the device may as shown in FIG. 5, be provided with a cross-section which is different from that of the tube 34. Absorption device 56 therefore defines, with tubular extension 34, a number of passages 58 which enable the fluid to flow up and along device 56 according to the depth of fluid in the chamber 48. This improves and facilitates absorption of the fluid into the absorption device.

It will be readily appreciated that the storage or absorption device 56 constitutes, ancillary to its storage characteristic, a device which impedes the flow of fluid from the chamber 48 into the aspiration tube 44 and thus impedes the flow of the fluid from the spray bottle. This assures that the bottle can be used in inverted position without fluid being discharged from the device other than as intended through aspiration.

It will also be appreciated that the absorption device 56 constitutes a storage means which receives fluid from the chamber 48 and holds this fluid in a zone operatively disposed with respect to the aspiration tube 44 independently of the position of the bottle. In other words, the bottle can be tilted without affecting the fact that absorption means 56 holds a portion of the fluid adjacent the tube 44 for purposes of aspiration.

Inasmuch as aspiration causes an evacuation or discharge of the fluid contents of chamber 48, provision is made for restoring atmospheric pressure to chamber 48 above the level of the fluid therein. For this purpose tubular extension 34 is provided with one or more openings 60 (FIG. 4) in association with an annular groove 62, wherein is accommodated a resilient O-ring 64 or the like. Radial opening 60 is disposed in operative association with the slot 42 wherethrough air is passed to enter unrestricted by the O-ring 64 into chamber 48 when there is an underpressure in said chamber. The O-ring 64 is, however, of such shape and resiliency as to be held firmly in the associated groove 62 to prevent the flow of fluid through radial opening 60 when the spray bottle is inverted.

To assure a fluid-tight connection between casings 10 and 12, there is provided a resilient washer 66 which encircles tubular extension 34 and is sandwiched between the two casings 10 and 12. This assures retaining the casings together and further assures the fluid-tight assembly of the spray bottle. To accommodate washer 66, casing 12 may be provided with a reentrant angle (not shown) adjacent the washer so that the washer can be urged into the same.

The ribs 20 and the area 22, as noted above, are provided in casing 10, as best illustrated in FIG. 4, for purposes of best discharge and aspiration. In FIG. 4 it is seen that areas 22 preferably constitute parallel wall sections which are displaceable towards one another when casing 10 is clasped in the hand of an operator. Areas 22 are to be considered as relatively large casing sections displaceable as units to provide for an optimum discharge of pneumatic medium from casing 10 and thus to provide for optimum aspiration. In this regard, attention is directed to the fact that in some cases the impeding function of absorption device 56 may warrant the provision of this ancillary feature in order to assure on optimum discharge velocity of the air from casing 10 in order to in turn assure that a fine mist or atomized fluid is discharged from the discharge opening 28.

It will be clear from the shapes of casings 10 and 12 that the spray device of the invention is readily adapted to simple and economic blow molding techniques such as are currently and conveniently being employed to reduce the cost of dispensing devices to a minimum. It is a characteristic feature of the invention in this regard that the techniques achieved and contemplated by the invention are readily adapted to the aforementioned blow molding procedures.

FIG. 6 illustrates a further embodiment of the invention whereby an upper casing 68 is provided with a relatively short tubular extension 70, there being accommodated in and extending out of tubular extension 70 an absorption device 72, the function of which is similar to that of the structure illustrated in FIG. 2, wherein the absorption device is substantially in entirety accommodated within the associated tubular extension.

In FIG. 6, aspirating tube 74 is provided with radial openings 76 which facilitate the egrees of fluid from absorption device 72 into the aspirating tube 74 and thence from the spray bottle.

For preparation, the spray device of the invention is fabricated preferably in two parts, one part of which is charged with the fluid to be dispensed, the other part being subsequently engaged with a storage device to perform the functions noted above. As has been seen, this technique provides for aspiration by the dispenser in all possible positions, this constituting a distinct invention as regards the prior art.

While it is true that an absorption device has been shown for purposes of constituting the storage mechanism and the impeding mechanism, it is possible within the scope of the invention to employ other storage and impeding devices such as, for example, hollow chambers having small perforations opening into the same for storing fluid adjacent an associated aspiration tube.

There will now be obvious to those skilled in the art many modifications and variations of the structures set forth above. These modifications and variations will not, however, depart from the scope of the invention if defined by the following claims.

What is claimed is:

1. A spray bottle comprising means defining a pneumatic chamber and a fluid chamber, said chambers being separate from each other, connecting means operatively connecting the chambers and enabling a distribution of said fluid by a pneumatic medium in said pneumatic chamber, and storage means in said fluid chamber for storing at least a portion of the fluid in the latter independently of the position of said bottle, said storage means storing the fluid in a zone operatively disposed with respect to said connecting means for purposes of said distribution, said storage means further preventing free movement of the fluid from the fluid chamber via the connecting means.

2. A bottle as claimed in claim 1 wherein said distribution is effected by aspiration and the first said means includes a relatively flexible casing defining said pneumatic chamber, said casing being provided with an opening permitting the escape of pneumatic medium displaced by a flexing of the casing.

3. A bottle as claimed in claim 1 wherein the first said means includes a relatively flexible casing portion and a relatively stiff casing portion.

4. A bottle as claimed in claim 1 wherein said storage means includes an absorption device adapted for absorbing fluid from the fluid chamber.

5. A bottle as claimed in claim 1 wherein said storage means comprises a tube extending between and connecting said pneumatic and fluid chambers and protruding into said fluid chamber, and an absorption device within said tube.

6. A bottle as claimed in claim 1 wherein the first said means includes aspiration means operatively coupled to said connecting means for aspirating fluid from said storage means.

7. A bottle as claimed in claim 6 wherein the first said means includes a relatively flexible casing and ribs in said casing confining and reinforcing a relatively large section of said casing, said section being displaceable as a unit to provide for optimum discharge and aspiration.

8. A bottle as claimed in claim 1 wherein said storage means comprises means enabling pneumatic medium to flow unidirectionally from said pneumatic to said fluid chamber to prevent reduction of pressure in the fluid chamber upon distribution of the fluid.

9. A bottle as claimed in claim 1 wherein said storage means impedes the flow of fluid into said pneumatic chamber from the fluid chamber via the connecting means whereby an inadvertent discharge of fluid from the bottle is prevented.

10. A spray bottle comprising two hollow members connected together and cooperatively constituting a dispensing structure, one of said members being relatively stiff and being adapted for storing a fluid, the other of said members being relatively flexible and constituting an air chamber, said one member being provided with an opening and said other member including a tubular extension extending through said opening into said one member, an aspiration tube on said other member and extending into said tubular extension, means at least in part between said tube and tubular extension to prevent a movement of fluid from said one member into said other member other than via said aspiration tube, and an absorption device in said tubular extension and adjacent said aspiration tube to store fluid near the latter for distribution by aspiration.

11. A bottle as claimed in claim 10 wherein the tubular extension is provided with a radial opening adjacent said means, said means defining a peripheral groove connecting the air chamber with said radial opening to supply air to said one member, said bottle further comprising means operatively disposed with respect to said radial opening to prevent the flow of fluid into the same.

12. A bottle as claimed in claim 11 wherein the latter said means is an O-ring.

13. A bottle as claimed in claim 10 wherein said members are detachable and said one member has a shape adapted to receive and seat said other member.

14. A bottle as claimed in claim 13 comprising a resilient sealing member encircling said tubular extension and sandwiched between said hollow members.

15. A bottle as claimed in claim 10 wherein said tubular extension and said one hollow member cooperatively including a bead and socket arrangement to lock the hollow members together.

16. A bottle as claimed in claim 10 wherein said other hollow member is provided with an opening and includes a plug for said opening, said plug being provided with a discharge opening for the discharge of air and a fluid channel for discharging the fluid, said discharge opening and fluid channel being operatively connected in aspirating relation, said aspiration tube being coupled to said fluid channel.

17. A bottle as claimed in claim 10 wherein said absorption device is of a cross-section different from that of the tubular extension and defines fluid flow chambers therewith.

18. A fluid dispenser comprising first mean defining an air chamber and including a tubular extension, an aspiration tube on said first means and extending through said chamber into said tubular extension, said first means further defining a fluid chamber having an opening into which said extension protrudes, and second means in said tubular extension to store fluid adjacent said aspiration tube independently of the position of said dispenser and to block free fluid flow into said aspiration tube.

19. A dispenser as claimed in claim 18 wherein said second means extends substantially out of the tubular extension.

20. A dispenser as claimed in claim 18 wherein said second means is substantially entirely accommodated within said tubular extension.

References Cited in the file of this patent

UNITED STATES PATENTS

| | | |
|---|---|---|
| Re. 24,784 | Sherman | Feb. 16, 1960 |
| 644,703 | Buckley | Mar. 6, 1900 |
| 2,128,239 | Ferngren | Aug. 30, 1938 |
| 2,235,946 | Reilly | Mar. 25, 1941 |
| 2,272,943 | Healy | Feb. 10, 1942 |
| 2,311,367 | Chambers | Feb. 16, 1943 |
| 2,676,060 | Montenier | Apr. 20, 1954 |
| 2,815,889 | Stetz et al. | Dec. 10, 1957 |
| 2,876,782 | Hudgens | Mar. 10, 1959 |
| 2,980,342 | Armour | Apr. 18, 1961 |
| 3,004,718 | Gorman | Oct. 17, 1961 |